(12) United States Patent
Nishidate et al.

(10) Patent No.: US 7,792,008 B2
(45) Date of Patent: Sep. 7, 2010

(54) OPTICAL PICKUP APPARATUS

(75) Inventors: Tetsuo Nishidate, Daito (JP); Masaaki Suetsugu, Daito (JP); Toyoshi Nogami, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 469 days.

(21) Appl. No.: 11/979,983

(22) Filed: Nov. 13, 2007

(65) Prior Publication Data

US 2008/0259768 A1    Oct. 23, 2008

(30) Foreign Application Priority Data

Nov. 20, 2006    (JP) ............... 2006-313292

(51) Int. Cl.
*G11B 7/00* (2006.01)
(52) U.S. Cl. ............................. 369/121; 369/44.14
(58) Field of Classification Search .......... 369/121, 369/44.14, 44.15, 44.17, 44.21; 372/107
See application file for complete search history.

(56) References Cited

U.S. PATENT DOCUMENTS

2004/0218501 A1*  11/2004  Sogawa et al. ................ 369/99
2004/0257927 A1*  12/2004  Sogawa et al. ............... 369/121
2006/0018359 A1*   1/2006  Yoshizawa et al. .......... 372/107
2007/0050803 A1*   3/2007  Hamatani et al. ............ 720/689
2007/0104076 A1*   5/2007  Nakagawa et al. .......... 369/122
2007/0115615 A1*   5/2007  Hamatani .................... 361/600

FOREIGN PATENT DOCUMENTS

| JP | 10097730 | 4/1998 |
| JP | 2005108300 | 4/2005 |
| JP | 2006134408 | 5/2006 |

* cited by examiner

*Primary Examiner*—Thang V Tran
(74) *Attorney, Agent, or Firm*—Bacon & Thomas, PLLC

(57) ABSTRACT

There is provided an optical pickup apparatus in which the assembling workability such as chucking of an LD holder by an adjusting jig and spreading of adhesive can be improved. In the optical pickup apparatus, multiple fitting portions (boss portions) 1*d* formed on one of a side wall surface 1*a* of a slide base 1 and an LD holder 10 are fitted loosely into respective multiple fitted portions (hole portions) 10*b* formed in the other one so that an adjustment space 12 required for adjustment of a laser diode 6 is ensured between each fitting portion and fitted portion. This allows the LD holder 10 to be fixed temporarily to the side wall surface 1*a* of the slide base 1 with the laser diode 6 being adjustable freely, resulting in an improvement in the assembling workability such as chucking of the holder by the adjusting jig and spreading of adhesive.

11 Claims, 7 Drawing Sheets

OPTICAL PICKUP APPARATUS

BACKGROUND OF THE INVENTION

1. Field of the Invention

The present invention relates to optical pickup apparatuses to be mounted on an optical disk apparatus and, in particular, to an optical pickup apparatus in which the mount of an LD holder for holding a laser diode is improved to thereby improve the assembling workability.

2. Description of the Related Art

In conventional optical pickup apparatuses to be mounted on an optical disk apparatus, an LD holder with a laser diode held therein is mounted on a side wall surface of a slide base, on which a grating, a polarizing beam splitter or a half mirror, a raising mirror, a collimator lens, an objective lens, an objective lens actuator, and a light detector, etc., are disposed, in such a manner that the laser diode is positioned right in front of the grating.

There has been known such an LD holder for optical pickup apparatuses in which a holder main body including a laser diode is held swingably on a sheet metal mount (refer to Japanese Patent Laid-Open Publication No. 2006-134408). The LD holder is mounted on a side wall surface of a slide base by positioning while sliding the sheet metal mount along the side wall surface of the slide base to fix the mount by adhesive as well as by adjusting the tilt angle of the laser diode while causing the holder main body to perform a so-called tilting motion to fix the holder main body to the mount by adhesive.

There has also been known an optical pickup apparatus in which an engaging hole is formed in a printed substrate with a photodiode mounted thereon, while a solderable engaging pin is provided in a protruding manner on a pickup base, and the engaging pin is inserted into and soldered to the engaging hole so that the photodiode can be positioned accurately (refer to Japanese Patent Laid-Open Publication No. Hei 10-97730). There has further been known an optical pickup apparatus in which a laser diode is mounted accurately on an optical base, and a radiation holder is fitted to the laser diode by engaging a convex portion inside the holder slidably with a V-shaped groove in the stem portion of the laser diode so that the holder can be positioned in the direction of rotation (refer to Japanese Patent Laid-Open Publication No. 2005-108300).

However, the LD holder disclosed in Japanese Patent Laid-Open Publication No. 2006-134408 requires the operations of positioning and fixing the sheet metal mount to the side wall surface of the slide base by adhesive and of adjusting the tilt angle of the laser diode while causing the holder main body to perform a tilting motion to fix the holder main body to the mount by adhesive, which suffers from a problem in that the assembling workability is not so good. In addition, not only the holder main body but also the sheet metal mount is required, which suffers from a problem in that the number of parts is increased.

Meanwhile, in the optical pickup apparatus disclosed in Japanese Patent Laid-Open Publication No. Hei 10-97730, the engaging pin on the pickup base is inserted into the engaging hole in the printed substrate with the photodiode mounted thereon so that the photodiode can be positioned accurately and fixed firmly by soldering. However, the printed substrate cannot be chucked easily by an adjusting jig, and further thus inserting the engaging pin into the engaging hole makes it difficult to adjust the tilt angle of the photodiode, which also suffers from a problem in that the assembling workability is not so good.

Also, in the optical pickup apparatus disclosed in Japanese Patent Laid-Open Publication No. 2005-108300, the convex portion inside the radiation holder is engaged slidably with the V-shaped groove in the stem portion of the laser diode so that the holder can be positioned in the direction of rotation and fixed to the stem portion. However, it is not easy to chuck the laser diode by an adjusting jig, adjust the direction of the optical axis, and mount the laser diode accurately on the optical base, which also suffers from a problem in that the assembling workability is not so good.

SUMMARY OF THE INVENTION

The present invention has been made under the above-described circumstances, and an object thereof is to provide an optical pickup apparatus in which an LD holder with a laser diode held therein can be fixed temporarily to a side wall surface of a slide base with the laser diode being adjustable freely, whereby the assembling workability such as chucking of the LD holder by an adjusting jig and spreading of adhesive can be improved. Then, another object of the present invention is to provide an optical pickup apparatus that requires no sheet metal mount for causing the holder to perform a so-called tilting motion to reduce the number of parts and thereby the cost therefor.

In order to achieve the foregoing objects, the present invention is directed to an optical pickup apparatus in which an LD holder with a laser diode held therein is fixed by adhesive to a side wall surface of a slide base, on which a grating, a polarizing beam splitter or a half mirror, a raising mirror, a collimator lens, an objective lens, an objective lens actuator, and a light detector are disposed, in such a manner that the laser diode is positioned right in front of the grating, wherein one of the side wall surface of the slide base and the LD holder has multiple fitting portions and the other has multiple fitted portions, the fitting portions being fitted loosely into the respective fitted portions so that an adjustment space required for adjustment of the laser diode is ensured therebetween.

The optical pickup apparatus may include the following representative aspects: (a) the slide base has at least one boss portion as a fitting portion formed on the side wall surface and the LD holder has at least one hole portion as a fitted portion formed in a surface facing the side wall surface of the slide base and having a diameter greater than that of the boss portion, the boss portion being fitted loosely into the hole portion so that an adjustment space is ensured therebetween; (b) the slide base has at least one hole portion as a fitted portion formed in the side wall surface and the LD holder has at least one boss portion as a fitting portion formed on a surface facing the side wall surface of the slide base and having a diameter smaller than that of the hole portion, the boss portion being fitted loosely into the hole portion so that an adjustment space is ensured therebetween; and (c) the slide base has at least one boss portion as a fitting portion formed on the side wall surface and the LD holder has at least one notched portion as a fitted portion formed in a part on either side corresponding to the boss portion and having a size capable of fitting the boss portion loosely therein, the boss portion being fitted loosely into the notched portion so that an adjustment space is ensured therebetween.

Also, in the optical pickup apparatus according to the present invention, the LD holder preferably has recessed portions formed in a pair of opposite sides for chucking by an adjusting jig.

The present invention is also directed to a further specified preferable optical pickup apparatus in which an LD holder with a laser diode held therein is fixed by adhesive to a side wall surface of a slide base, on which a grating, a polarizing beam splitter or a half mirror, a raising mirror, a collimator lens, an objective lens, an objective lens actuator, and a light detector are disposed, in such a manner that the laser diode is positioned right in front of the grating, wherein one of the side wall surface of the slide base and the LD holder has multiple fitting portions and the other has multiple fitted portions, the fitting portions being fitted loosely into the respective fitted portions so that an adjustment space required for adjustment of the laser diode is ensured therebetween, and wherein the LD holder has recessed portions formed in a pair of opposite sides for chucking by an adjusting jig and a pair of LD adjusting convex portions formed on a surface facing the side wall surface of the slide base to come into line or point contact with the side wall surface of the slide base.

In the optical pickup apparatus according to the present invention, the multiple fitting portions formed on one of the side wall surface of the slide base and the LD holder are fitted loosely into the respective multiple fitted portions formed in the other one so that an adjustment space required for adjustment of the laser diode is ensured between each fitting portion and fitted portion, whereby the LD holder can be fixed temporarily, before adhesive fixation, to the side wall surface of the slide base with the laser diode being adjustable freely, which facilitates the chucking of the LD holder by the adjusting jig and spreading of adhesive (ultraviolet-setting adhesive) onto the LD holder. Therefore, the LD holder can be fixed efficiently and accurately to the side wall surface of the slide base by hardening the adhesive under ultraviolet radiation after adjusting the position of the laser diode, direction of the optical axis, and distribution of luminous intensity, etc., using the adjusting jig, resulting in an improvement in the assembling workability.

Then, in the arrangement that the LD holder has recessed portions formed in a pair of opposite sides for chucking by the adjusting jig, the LD holder can be chucked reliably and easily by clipping the recessed portions with the adjusting jig, which allows the laser diode to be adjusted accurately with no displacement of the LD holder, resulting in a further improvement in the assembling workability.

Also, in the further specified preferable optical pickup apparatus according to the present invention wherein the LD holder has a pair of LD adjusting convex portions formed on a surface facing the side wall surface of the slide base, the position of the laser diode, direction of the optical axis, and distribution of luminous intensity, etc., can be adjusted accurately by causing the LD holder to perform a tilting motion around each LD adjusting convex portion and to slide along the side wall surface of the slide base with the LD adjusting convex portions being in line or point contact with the side wall surface of the slide base, which requires no conventional sheet metal mount for tilting motion, resulting in a reduction in the number of parts and thereby the cost therefor in addition to the foregoing effects.

DESCRIPTION OF THE PREFERRED EMBODIMENTS

Specific embodiments of the present invention will hereinafter be described in detail with reference to the accompanying drawings.

Figure 1:
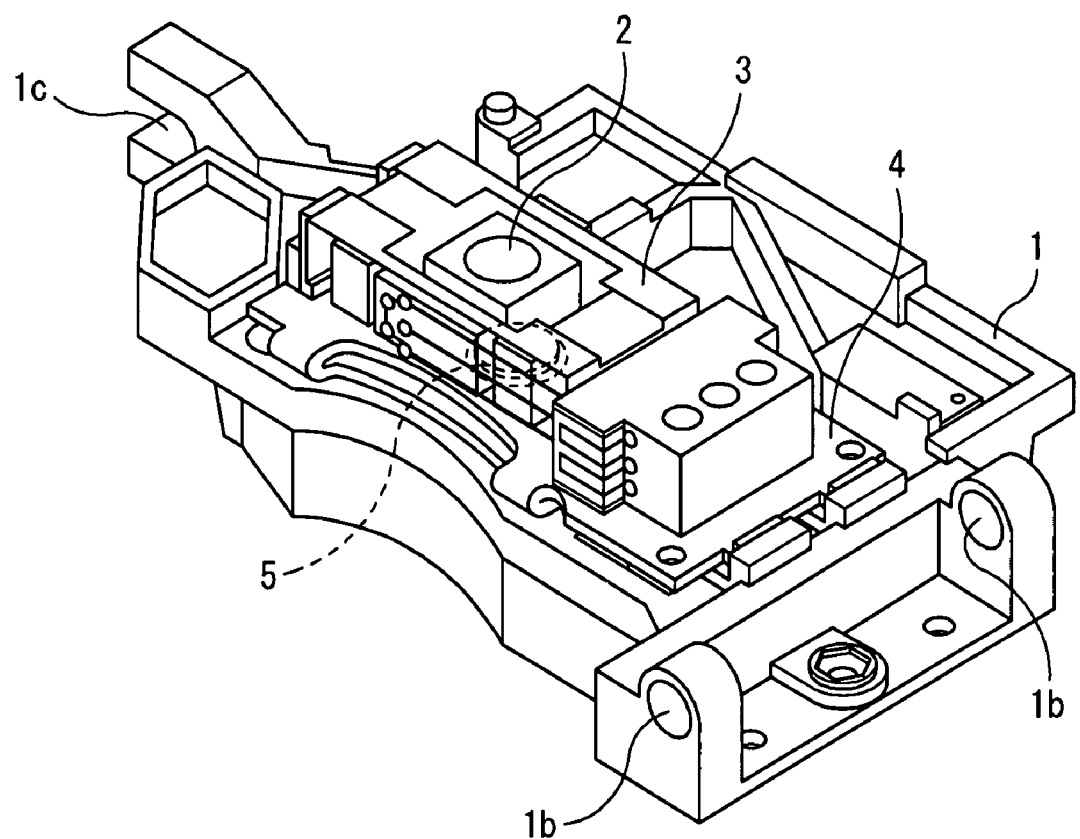
FIG. 1 is a perspective view of an optical pickup apparatus according to an embodiment of the present invention.
Figure 2:
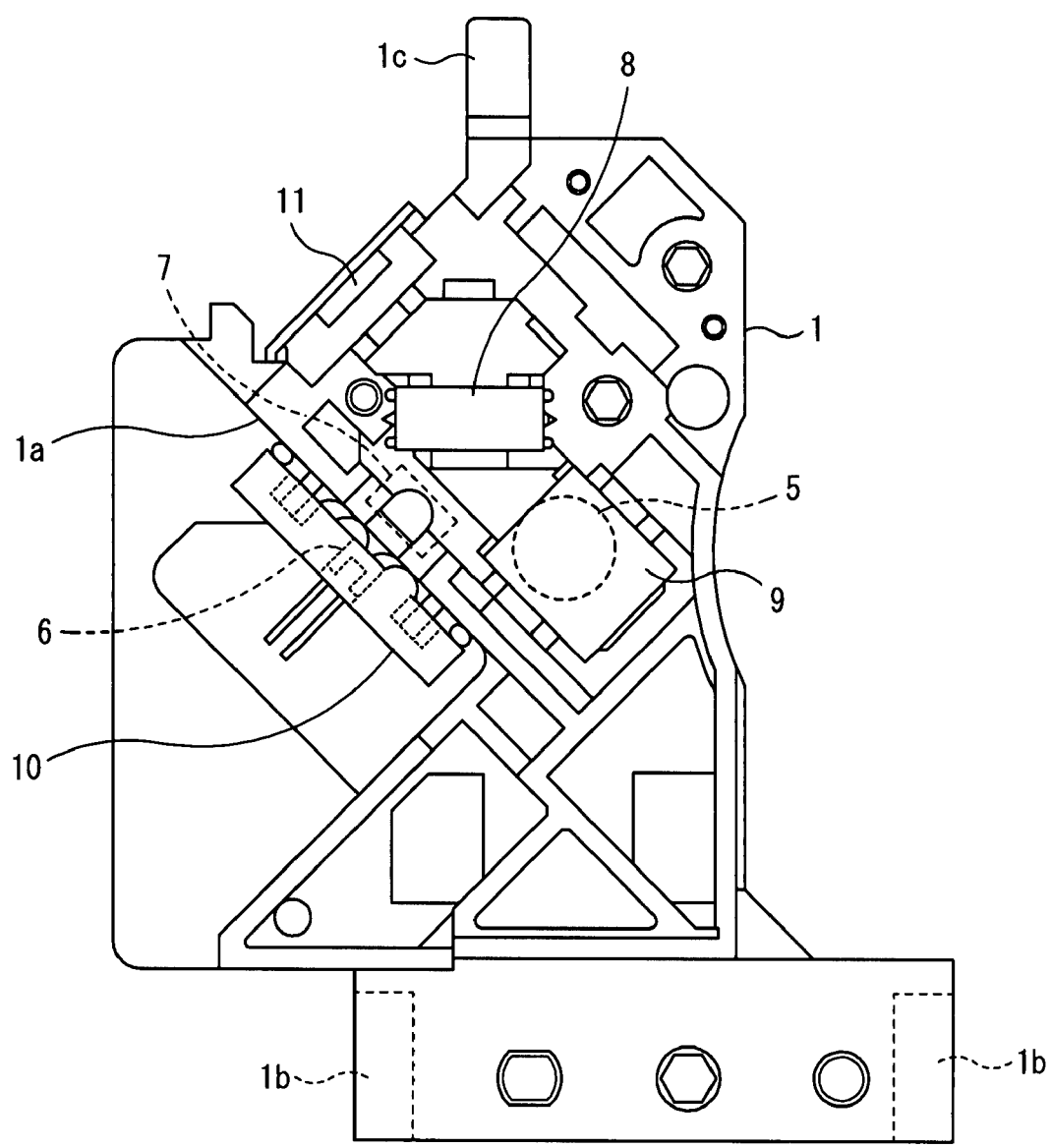
FIG. 2 is a bottom view of the optical pickup apparatus.
Figure 3:
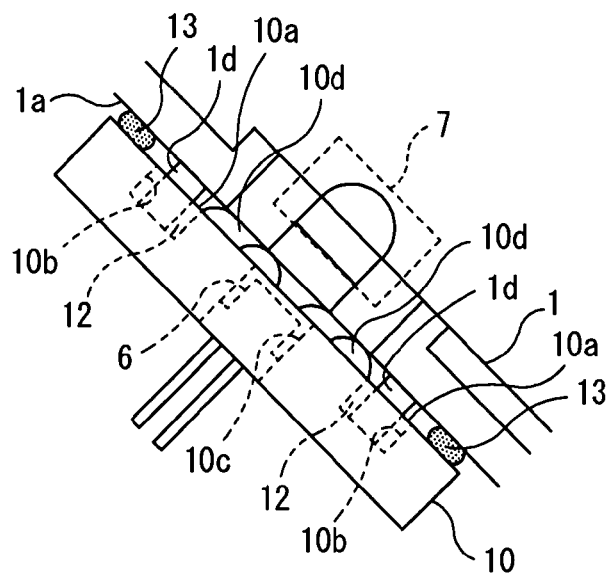
FIG. 3 is an enlarged partial bottom view of the optical pickup apparatus.
Figure 4:
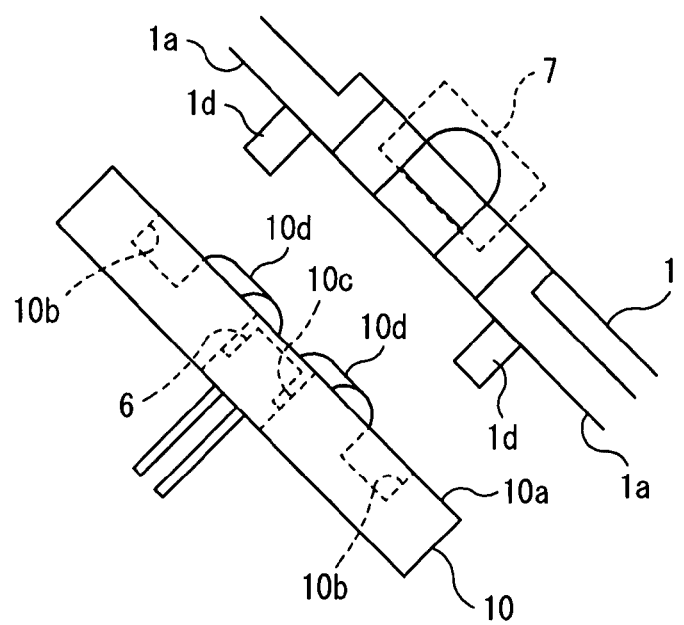
FIG. 4 is an enlarged partial bottom view of the optical pickup apparatus with an LD holder being separated.
Figure 5:
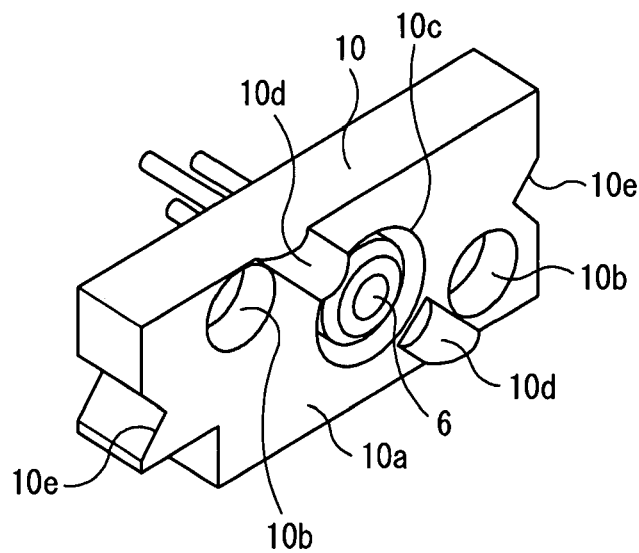
FIG. 5 is a perspective view of the LD holder in the optical pickup apparatus.

FIG. 1 is a perspective view of an optical pickup apparatus according to an embodiment of the present invention; FIG. 2 is a bottom view of the optical pickup apparatus; FIG. 3 is an enlarged partial bottom view of the optical pickup apparatus; FIG. 4 is an enlarged partial bottom view of the optical pickup apparatus with an LD holder being separated; and FIG. 5 is a perspective view of the LD holder in the optical pickup apparatus.

The optical pickup apparatus is to be mounted on, for example, an optical disk recording and reproducing apparatus. As shown in FIG. 1, an objective lens actuator 3 with an objective lens 2 held thereon and a support base 4 therefor are mounted on the upper surface of a slide base 1 made of metal such as aluminum die-cast. The objective lens actuator 3 is adapted to drive the objective lens 2 to perform focusing control, tracking control, and tilt control for an optical disk and is positioned in such a manner that the objective lens 2 is positioned just above a collimator lens 5 that is fixed in a hole around the center of the slide base 1.

Meanwhile, as shown in FIG. 2, a grating 7 for diffracting a laser beam emitted from a laser diode 6 to generate three beams, a half mirror 8 for reflecting the beams perpendicularly, and a raising mirror 9 for reflecting the perpendicularly reflected beams further upward are installed on the underside surface of the slide base 1, and the raising mirror 9 is positioned just below the collimator lens 5. Then, an LD holder 10 with the laser diode 6 held therein is fixed by adhesive to a side wall surface 1a of the slide base 1 in such a manner that the laser diode 6 is positioned right in front of the grating 7. Further, a light detector 11 for detecting reflected light from the optical disk is attached to the side wall surface of the slide base 1 on the side opposite to the raising mirror 9 with respect to the half mirror 8.

In addition, as shown in FIG. 1, bearing portions 1b and 1c are formed on either side of the slide base 1, and the slide base 1 is to be mounted slidably on the optical disk recording and reproducing apparatus by inserting two guide shafts (primary and secondary shafts) of the optical disk recording and reproducing apparatus into the respective bearing portions 1b and 1c.

The thus arranged optical pickup apparatus is adapted to perform recording and reproduction by applying a laser beam emitted from the laser diode 6 onto the optical disk while moving in the tracking direction along the two guide shafts of the optical disk recording and reproducing apparatus and then by detecting reflected light from the optical disk using the light detector 11. That is, the laser beam emitted from the laser diode 6 is diffracted into three beams at the grading 7, reflected perpendicularly at the half mirror 8, further reflected upward at the raising mirror 9, transmits through the collimator lens 5, and converged through the objective lens 2 to be applied onto the optical disk. Then, the light reflected at the optical disk passes through the objective lens 2 and then the collimator lens 5 to be reflected at the raising mirror 9, and then transmits through the half mirror 8 to be detected in the light detector 11 for recording and reproduction.

The optical pickup apparatus is mainly characterized in the mount of the LD holder 10 with the laser diode 6 held therein. That is, as shown in FIGS. 3 and 4, two boss portions id and id as fitting portions are provided in a protruding manner on either side of the grating 7 on the side wall surface 1a of the slide base 1 on which the LD holder 10 is mounted. In a surface 10a of the LD holder 10 facing the side wall surface, two hole portions 10b and 10b as fitted portions having a diameter greater than that of each boss portion 1d are formed on either side of a fitting hole 10c for fitting the laser diode 6 therein. Then, as shown in FIG. 3, the boss portions 1d and 1d are fitted loosely into the respective hole portions 10b and 10b so that an adjustment space 12 required for adjustment of the laser diode 6 is ensured between each boss portion id and hole portion 10b.

Also, as shown in FIG. 5, a pair of arched LD adjusting convex portions 10d and 10d to be brought into line contact with the side wall surface 1a of the slide base 1 are integrally formed on either side of the fitting hole 10c for the laser diode 6 on the surface 10a of the LD holder 10. The LD adjusting convex portions 10d and 10d are preferably formed obliquely at an angle corresponding to the fitting angle of the laser diode 6 to the LD holder 10. Then, the LD holder 10 has V-shaped recessed portions 10e and 10e formed in a pair of opposite sides for chucking by an adjusting jig.

The LD holder 10 with the laser diode 6 held therein is fixed by ultraviolet-setting adhesive 13 to the side wall surface 1a of the slide base 1 in the following manner.

a) First, the LD holder 10 is fixed temporarily to the side wall surface 1a of the slide base 1 with the laser diode 6 being adjustable freely by fitting the boss portions 1d and 1d on the side wall surface 1a loosely into the respective hole portions 10b and 10b in the LD holder 10 so that the adjustment space 12 is ensured between each boss portion 1d and hole portion 10b. In this case, since the LD holder 10 is pressed against the side wall surface 1a by flexible printed circuits (not shown in the drawings) that are soldered to the terminals of the laser diode 6, the LD holder 10 cannot fall off.

b) Next, the ultraviolet-setting adhesive 13 is provided and spread between the LD holder 10 and the side wall surface 1a. Since the LD holder 10 is fixed temporarily to the side wall surface 1a of the slide base 1, the spreading of the adhesive can be carried out easily and efficiently.

c) Next, the LD holder 10 is chucked by clipping the recessed portions 10e and 10e for chucking in the opposite sides of the LD holder 10 between the forks of the adjusting jig, and the position of the laser diode 6, direction of the optical axis, and distribution of luminous intensity, etc., are adjusted by the adjusting jig. Thus clipping the recessed portions 10e and 10e for chucking in the LD holder 10 allows the LD holder 10 to be chucked reliably and easily, whereby the laser diode 6 can be adjusted with no displacement of the LD holder 10. In addition, the laser diode 6 can be adjusted accurately by causing the LD holder 10 to perform a tilting motion around each LD adjusting convex portion 10d on the LD holder 10 and to slide along the side wall surface 1a of the slide base 1 with the convex portions 10d and 10d being in line contact with the side wall surface 1a.

d) After the adjustment of the laser diode 6, the adhesive 13 is hardened under ultraviolet radiation with the LD holder 10 being kept in the same posture to complete the operation of mounting the LD holder 10, and then the forks of the adjusting jig are unclipped from the recessed portions 10e and 10e for chucking in the LD holder 10.

In the above-described optical pickup apparatus, the LD holder 10 can be fixed temporarily, before adhesive fixation, to the side wall surface 1a of the slide base 1 with the laser diode 6 being adjustable freely by fitting the boss portions 1d and 1d on the slide base 1 loosely into the respective hole portions 10b and 10b in the LD holder 10, which facilitates the chucking of the LD holder 10 by the adjusting jig and spreading of the ultraviolet-setting adhesive 13, and further allows the laser diode 6 to be adjusted easily and accurately. Therefore, the effect that the assembling workability is improved can be achieved. Then, no conventional sheet metal mount for tilting motion of the LD holder is required, resulting in a reduction in the number of parts and thereby the cost therefor.

Figure 6:
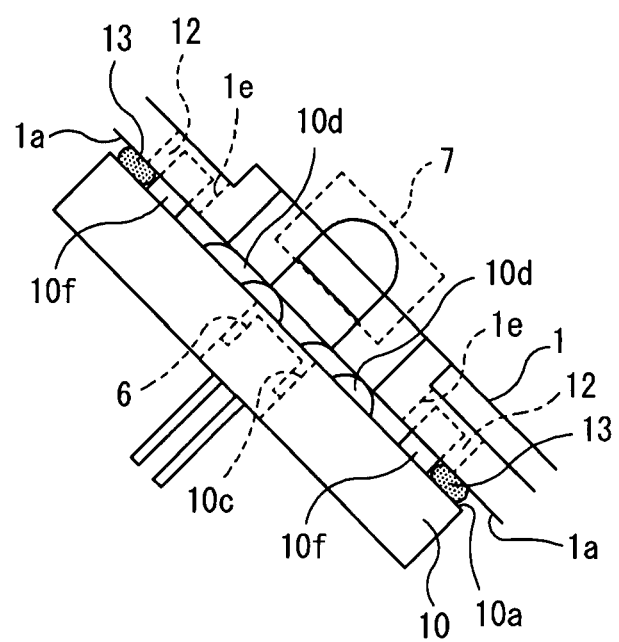
FIG. 6 is an enlarged partial bottom view of an optical pickup apparatus according to another embodiment of the present invention.
Figure 7:
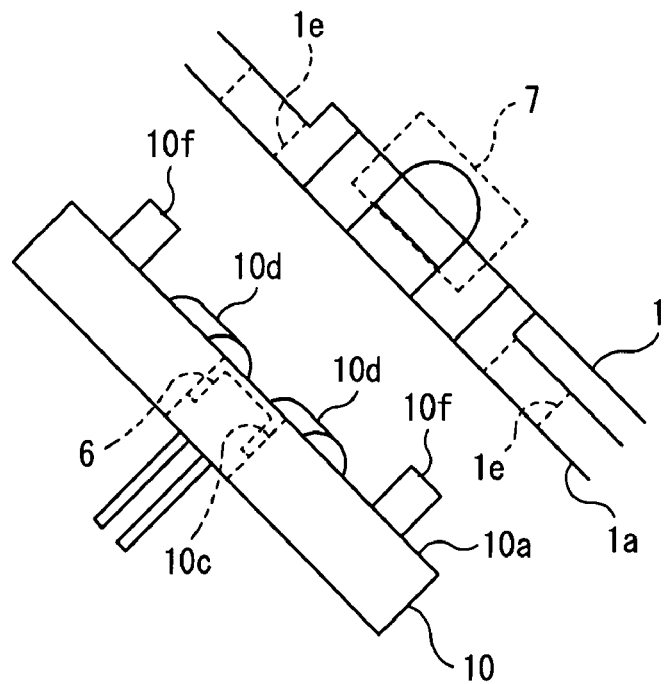
FIG. 7 is an enlarged partial bottom view of the optical pickup apparatus with an LD holder being separated.

FIG. 6 is an enlarged partial bottom view of an optical pickup apparatus according to another embodiment of the present invention; FIG. 7 is an enlarged partial bottom view of the optical pickup apparatus with an LD holder being separated; and FIG. 8 is a perspective view of the LD holder in the optical pickup apparatus.

Figure 8:
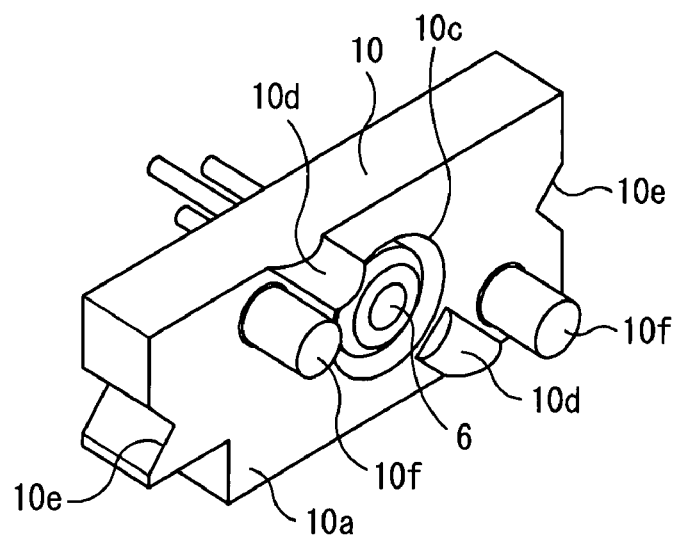
FIG. 8 is a perspective view of the LD holder in the optical pickup apparatus.

As shown in FIGS. 6 to 8, two hole portions 1e and 1e as fitted portions are formed on either side of the grating 7 in the side wall surface 1a of the slide base 1 in the optical pickup apparatus. In a surface 10a of the LD holder 10 facing the side wall surface, two boss portions 10f and 10f as fitting portions having a diameter smaller than that of each hole portion 1e are formed on either side of a fitting hole 10c for fitting the laser diode 6 therein. Then, as shown in FIG. 6, the boss portions 10f and 10f are fitted loosely into the respective hole portions 1e and 1e so that the adjustment space 12 required for adjustment of the laser diode 6 is ensured between each boss portion 10f and hole portion 1e.

In this optical pickup apparatus, the LD holder 10 is fixed temporarily to the side wall surface 1a of the slide base 1 with the laser diode 6 being adjustable freely by fitting the boss portions 10f and 10f on the LD holder 10 loosely into the respective hole portions 1e and 1e in the slide base 1, and after the adjustment of the laser diode 6 through the previously mentioned manner, the ultraviolet-setting adhesive 13 is hardened to fix the LD holder 10 to the side wall surface 1a of the slide base 1, exhibiting the same effect as the optical pickup apparatus according to the foregoing embodiment.

It is noted that since the other arrangements in this optical pickup apparatus are the same as those in the optical pickup apparatus according to the foregoing embodiment, identical components in FIGS. 6 to 8 are designated by the same reference numerals to omit redundant description.

Figure 9:
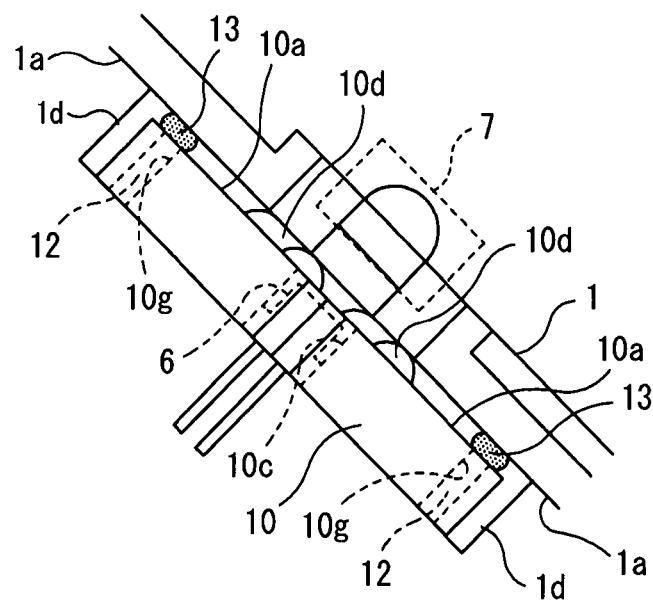
FIG. 9 is an enlarged partial bottom view of an optical pickup apparatus according to a further embodiment of the present invention.
Figure 10:
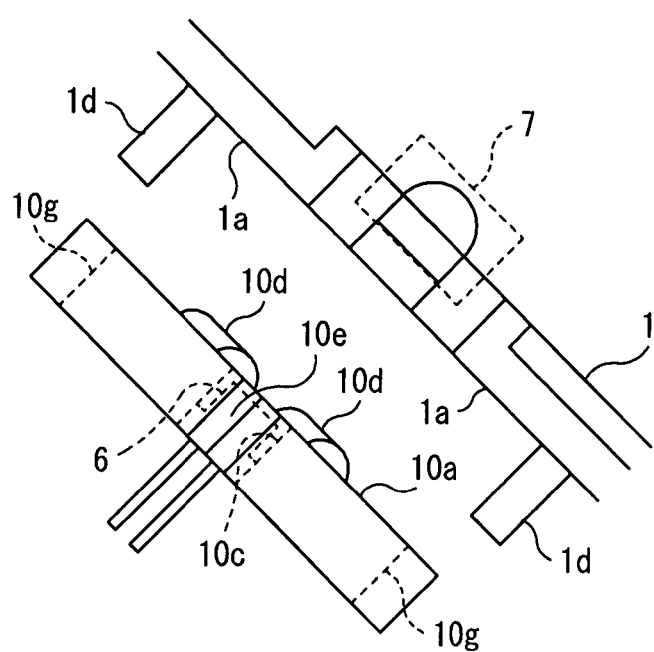
FIG. 10 is an enlarged partial bottom view of the optical pickup apparatus with an LD holder being separated.

FIG. 9 is an enlarged partial bottom view of an optical pickup apparatus according to a further embodiment of the present invention; FIG. 10 is an enlarged partial bottom view of the optical pickup apparatus with an LD holder being separated; and FIG. 11 is a perspective view of the LD holder in the optical pickup apparatus.

Figure 11:
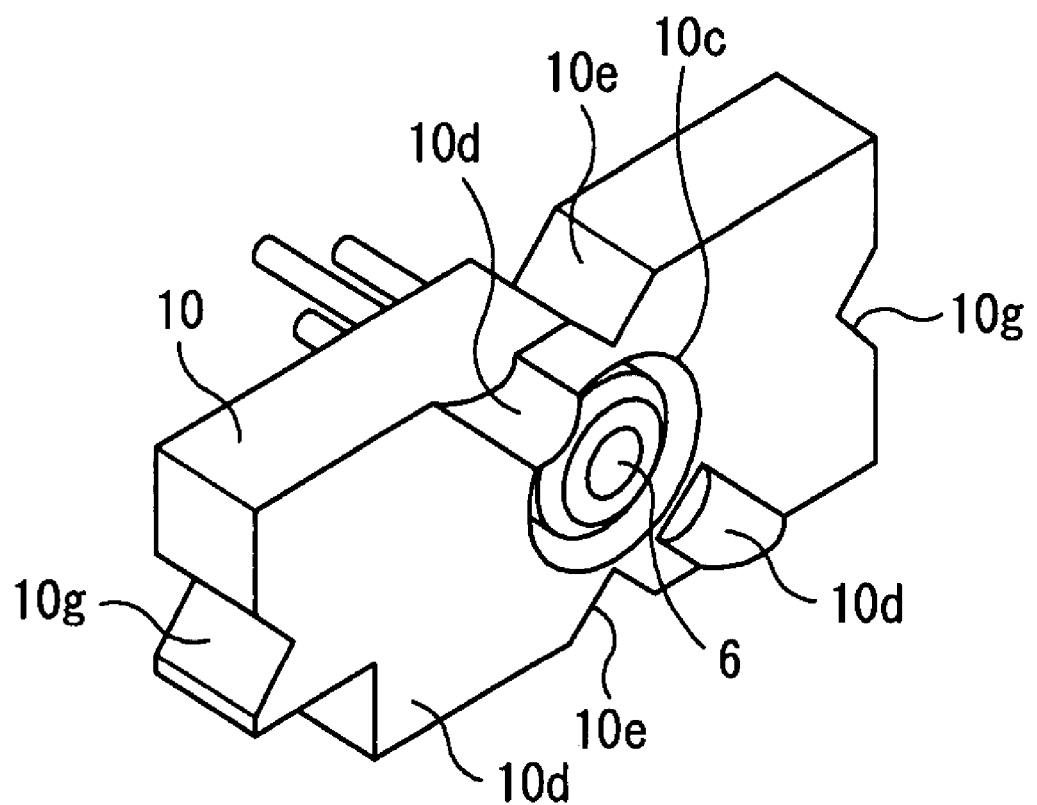
FIG. 11 is a perspective view of the LD holder in the optical pickup apparatus.

As shown in FIGS. 9 to 11, two boss portions 1d and 1d as fitting portions are formed on either side of the grating 7 on the side wall surface 1a of the slide base 1 in the optical pickup apparatus. The LD holder 10 has two V-shaped notched portions 10g and 10g as fitted portions formed in a part on either side corresponding to each boss portion and having a size capable of fitting each boss portion 1*d* loosely therein. Then, as shown in FIG. 9, the boss portions i*d* and i*d* are fitted loosely into the respective notched portions 10*g* and 10*g* so that the adjustment space 12 required for adjustment of the laser diode 6 is ensured between each boss portion i*d* and notched portion 10*g*. Also, as shown in FIG. 11, the LD holder 10 has V-shaped recessed portions 10*e* and 10*e* formed in the upper and lower surfaces for chucking by the adjusting jig.

In this optical pickup apparatus, the LD holder 10 is fixed temporarily to the side wall surface 1*a* of the slide base 1 with the laser diode 6 being adjustable freely by fitting the boss portions i*d* and i*d* on the slide base 1 loosely into the respective notched portions 10*g* and 10*g* in the LD holder 10, and after the adjustment of the laser diode 6 through the previously mentioned manner, the ultraviolet-setting adhesive 13 is hardened to fix the LD holder 10 to the side wall surface 1*a* of the slide base 1, exhibiting the same effect as the optical pickup apparatuses according to the foregoing embodiments.

It is noted that since the other arrangements in this optical pickup apparatus are the same as those in the optical pickup apparatuses according to the foregoing embodiments, identical components in FIGS. 9 to 11 are designated by the same reference numerals to omit redundant description.

Although the optical pickup apparatus according to the present invention has heretofore been described with reference to certain representative embodiments, the present invention is not restricted to the embodiments above, and it will be appreciated that the present invention is also applicable to, for example, optical pickup apparatuses incorporating a polarizing beam splitter instead of a half mirror, in which a laser beam emitted from a laser diode is diffracted into three beams at a grading, transmits through the polarizing beam splitter, reflected upward at a raising mirror, passes through a collimator lens and then an objective lens to be applied onto an optical disk, and reflected light from the optical disk transmits through the polarizing beam splitter to be detected in a light detector for recording and reproduction.

What is claimed is:

1. An optical pickup apparatus in which a laser diode holder with a laser diode held therein is fixed by adhesive to a side wall surface of a slide base, on which a grating, a polarizing beam splitter or a half mirror, a raising mirror, a collimator lens, an objective lens, an objective lens actuator, and a light detector are disposed, in such a manner that said laser diode is positioned right in front of said grating, wherein
   one of said side wall surface of said slide base and said laser diode holder has a plurality of fitting portions and the other has a plurality of fitted portions, said fitting portions being fitted loosely into said respective fitted portions so that an adjustment space required for adjustment of said laser diode is ensured therebetween, and wherein said laser diode holder has recessed portions formed in a pair of opposite sides for chucking by an adjusting jig and a pair of laser diode adjusting convex portions formed on a surface facing said side wall surface of said slide base to come into line or point contact with said side wall surface of said slide base.

2. An optical pickup apparatus in which a laser diode holder with a laser diode held therein is fixed by adhesive to a side wall surface of a slide base, on which a grating, a polarizing beam splitter or a half mirror, a raising mirror, a collimator lens, an objective lens, an objective lens actuator, and a light detector are disposed, in such a manner that said laser diode is positioned right in front of said grating, wherein:
   one of said side wall surface of said slide base and said laser diode holder has a plurality of fitting portions and the other has a plurality of fitted portions, said fitting portions being fitted loosely into said respective fitted portions so that an adjustment space required for adjustment of said laser diode is ensured therebetween; and
   said laser diode holder has recessed portions formed in a pair of opposite sides for chucking by an adjusting jig.

3. The optical pickup apparatus according to claim 2, wherein said slide base has at least one boss portion as a fitting portion formed on said side wall surface and said laser diode holder has at least one hole portion as a fitted portion formed in a surface facing said side wall surface of said slide base and having a diameter greater than that of said boss portion, said boss portion being fitted loosely into said hole portion so that an adjustment space is ensured therebetween.

4. The optical pickup apparatus according to claim 2, wherein said slide base has at least one hole portion as a fitted portion formed in said side wall surface and said laser diode holder has at least one boss portion as a fitting portion formed on a surface facing said side wall surface of said slide base and having a diameter smaller than that of said hole portion, said boss portion being fitted loosely into said hole portion so that an adjustment space is ensured therebetween.

5. The optical pickup apparatus according to claim 2, wherein said slide base has at least one boss portion as a fitting portion formed on said side wall surface and said laser diode holder has at least one notched portion as a fitted portion formed in a part on either side corresponding to said boss portion and having a size capable of fitting said boss portion loosely therein, said boss portion being fitted loosely into said notched portion so that an adjustment space is ensured therebetween.

6. The optical pickup apparatus according to claim 1, wherein said slide base has at least one boss portion as a fitting portion formed on said side wall surface and said laser diode holder has at least one hole portion as a fitted portion formed in a surface facing said side wall surface of said slide base and having a diameter greater than that of said boss portion, said boss portion being fitted loosely into said hole portion so that an adjustment space is ensured therebetween.

7. The optical pickup apparatus according to claim 1, wherein said slide base has at least one hole portion as a fitted portion formed in said side wall surface and said laser diode holder has at least one boss portion as a fitting portion formed on a surface facing said side wall surface of said slide base and having a diameter smaller than that of said hole portion, said boss portion being fitted loosely into said hole portion so that an adjustment space is ensured therebetween.

8. The optical pickup apparatus according to claim 1, wherein said slide base has at least one boss portion as a fitting portion formed on said side wall surface and said laser diode holder has at least one notched portion as a fitted portion formed in a part on either side corresponding to said boss portion and having a size capable of fitting said boss portion loosely therein, said boss portion being fitted loosely into said notched portion so that an adjustment space is ensured therebetween.

9. The optical pickup apparatus according to claim 2, wherein said slide base has at least one boss portion as a fitting portion formed on said side wall surface and said laser diode holder has at least one hole portion as a fitted portion formed in a surface facing said side wall surface of said slide base and having a diameter greater than that of said boss portion, said boss portion being fitted loosely into said hole portion so that an adjustment space is ensured therebetween.

10. The optical pickup apparatus according to claim 2, wherein said slide base has at least one hole portion as a fitted portion formed in said side wall surface and said laser diode holder has at least one boss portion as a fitting portion formed on a surface facing said side wall surface of said slide base and having a diameter smaller than that of said hole portion, said boss portion being fitted loosely into said hole portion so that an adjustment space is ensured therebetween.

11. The optical pickup apparatus according to claim 2, wherein said slide base has at least one boss portion as a fitting portion formed on said side wall surface and said laser diode holder has at least one notched portion as a fitted portion formed in a part on either side corresponding to said boss portion and having a size capable of fitting said boss portion loosely therein, said boss portion being fitted loosely into said notched portion so that an adjustment space is ensured therebetween.

* * * * *